US006954728B1

(12) United States Patent
Kusumoto et al.

(10) Patent No.: US 6,954,728 B1
(45) Date of Patent: Oct. 11, 2005

(54) SYSTEM AND METHOD FOR CONSUMER-SELECTED ADVERTISING AND BRANDING IN INTERACTIVE MEDIA

(75) Inventors: Laura Lee Kusumoto, San Francisco, CA (US); Earl David Sacerdoti, Alamo, CA (US); Leila Janine Sigler, Los Altos, CA (US); Sonya Lee Sigler, San Carlos, CA (US)

(73) Assignee: Avatizing, LLC, San Francisco, CA (US)

( * ) Notice: Subject to any disclaimer, the term of this patent is extended or adjusted under 35 U.S.C. 154(b) by 418 days.

(21) Appl. No.: 09/675,958

(22) Filed: Sep. 29, 2000

Related U.S. Application Data

(60) Provisional application No. 60/204,179, filed on May 15, 2000.

(51) Int. Cl.[7] ............................................. G06F 17/60
(52) U.S. Cl. ............................................. 705/1; 705/14
(58) Field of Search ........................................ 705/1, 14

(56) References Cited

U.S. PATENT DOCUMENTS

| | | | | |
|---|---|---|---|---|
| 5,287,268 A | * | 2/1994 | McCarthy | 705/14 |
| 6,023,270 A | * | 2/2000 | Brush et al. | 345/741 |
| 6,036,601 A | * | 3/2000 | Heckel | 463/42 |
| 6,329,994 B1 | * | 12/2001 | Gever et al. | 345/473 |
| 2001/0034661 A1 | * | 10/2001 | Ferreira | 705/26 |

FOREIGN PATENT DOCUMENTS

| | | | | |
|---|---|---|---|---|
| JP | 2001147881 A | * | 5/2001 | G06F/13/00 |
| WO | WO 01/88803 A2 | | 11/2001 | |

OTHER PUBLICATIONS www.avaterra.com, retrieved from Internet Archive Wayback Machine <www.archive.org>, page range Nov. 29, 1999–May 12, 2000.*
Riedman, Pat, "Avatars build character on 3–D chat sites," Advertising Age, p40, Sep. 9, 1996.*
"Fujitsu 2: WorldsAway Avatar Communities by Fujitsu Expand Onto the Internet; Fujitsu Launches Wed Services after Explosive Growth on CompuServe," Business Wire, Oct. 23, 1997.*

(Continued)

*Primary Examiner*—John G. Weiss
*Assistant Examiner*—Jonathan Ouellette
(74) *Attorney, Agent, or Firm*—Venable LLP; Ralph P. Albrecht; W. Russell Swindell

(57) ABSTRACT

Participants in a virtual world in an interactive, virtual environment implemented by computer networks and other interactive media such as interactive television are recruited to advertise products and brands to the other participants and viewers in the virtual world. Each user entering the virtual world may select from a set of available advertisements, which can be displayed in association with the user's avatar, virtual space and virtual objects in the virtual world. Users are incentivized to do this by the availability of rewards, such as coupons, real or virtual money or other resources, which are provided by the advertising sponsors, based on adoption of the advertising by the user, as well as on factors such as exposure of the selected advertisements to other users in the virtual world. Allowing the consumer to exercise advertising choice, this embodiment also facilitates collection of data regarding consumer preferences.

162 Claims, 9 Drawing Sheets

OTHER PUBLICATIONS

"CommerceCity Virtual World Changin the Face of Online Shopping; New Web Site Combines e–Commerce With 'Virtually'," PR Newswire, Jan. 21, 1999.*

"Avaterra.com Premieres At Web Marketing conference; Demostrates New Interface for Web Advertisements," Business Wire, Jun. 17, 1999.*

"Interactive Gaming and Communications Corp. (IGC) Provides Co–Branded Play For Fun Casino Game Site to Lycos." PR Newswire, p1841, Nov. 23, 1999.*

"World.com Reports Initial Advertising, E–commerce Results From Freeserve, UK's Leading ISP." PR Newswire, Apr. 7, 2000.*

Elkin, Tobi, "What Is There?", <http://www.there.com> last visited Aug. 17, 2004 at 9:31 p.m., pp. 2 pgs.

"Adaboy," <http://www.adaboy.com><NY–Pittsburg–LA, 622 Second Avenue Pittsburg, PA 15219> 2 pgs.,Undated advertising brochure based on U.S. Appl. No. 60/036,601.

* cited by examiner

| CUSTOMER ID | LAST NAME | FIRST NAME | E-MAIL ADDRESS | ENCRYPTED PASSWORD | LIST OF CURRENT AVATAR IDS | SAVED STATE | EXTERNAL INFO. | EXPERIENCE DATA | AGGREGATE DATA |
|---|---|---|---|---|---|---|---|---|---|
| | | | | | | | | | |

DATABASE LAYOUT - CONSUMER DATABASE

FIG. 4A

| ADVERTISE-MENT ID | ADVERTISER ID | POINTER TO AD CONTENT | DISPLAY MODE TYPE ID | AD RATE DATA | |
|---|---|---|---|---|---|
| | | | | | |

DATABASE LAYOUT - ADVERTISEMENT DATABASE

FIG. 4B

| ADVERTISE-MENT ID | AVATAR ID | ELAPSED TIME THIS AVATAR | ENVIRON-MENT | # OF OTHER EXPOSED AVATARS | # OF NON-PARTICIPATING VIEWERS | TOTAL EXPOSURE TIME | |
|---|---|---|---|---|---|---|---|

DATABASE LAYOUT - PRESENTATION TRACKING DATABASE

FIG. 4C

SYSTEM AND METHOD FOR CONSUMER-SELECTED ADVERTISING AND BRANDING IN INTERACTIVE MEDIA

This application claims priority from provisional application No. 60/204,179, dated May 15, 2000, now abandoned.

BACKGROUND OF THE INVENTION

1. Field of the Invention

The present invention relates to the field of interactive, online media, and more particularly to systems and methods enabling users to select or create advertising and branding to be applied to their avatars, virtual spaces and virtual objects within such media, and providing a reward structure to incentivize such users to adopt such advertising and display it to other users.

2. Description of the Related Art

The most engaging forms of online interactive entertainment immerse participants in a virtual world, which closely reflects the real world in some respects, but which in other respects dramatically and selectively amplifies real-world experience. To personalize the user's experience, the concept of "self" must be carried into the virtual environment as well. It is common in such forms of entertainment for each participant to be provided with an "avatar" that represents how the participant's "self" is manifested in the virtual world.

The concept of an "avatar" is used extensively in this application. To better understand how the term "avatar" is used herein, it is helpful to consider how the term has been used various contexts known in the art. For example:

From the definition of "AVATAR" in the Webopedia (http://webopedia.internet.com/TERM/a/avatar.html):

A graphical icon [link to definition of "icon"] that represents a real person in a cyberspace [link to definition of "cyberspace"]. When you enter the system, you can choose from a number of fanciful avatars. Sophisticated 3D avatars even change shape depending on what they are doing (e.g., walking, sitting, etc.).

From a discussion of the Palace: (http://www.rider.edu/users/suler/psycyber/psyav.html#Introduction):

Head? Body? This is the second visual feature of Palace: "avatars" or "props." Although these words often are used interchangeably, there is a slight distinction in the minds' of some users. Avatars refer to pictures, drawings, or icons that users choose to represent themselves. Props are objects that users may add to their avatars (say, a hat or cigar) or place into the Palace room or give to another person (say, a glass of beer or a bouquet of flowers). In this article, I will use the terms interchangeably.

From a discussion of Habitat:

In situations where there aren't existing working definitions of the user, —a scenario familiar to networked electronic environments, the users' identity has to be literally constructed prior to their presence. 'Habitat', an early MUD [Multi User Dungeons and Dragons game], developed an Avatar, a composite character constructed by its users, choosing body parts, sex, name, age etc. Users proceeded to interact with each other and the virtual environment via their Avatar. The avatar is an example of an electronic identity, and as such displays many of its common characteristics. A representation of an identity made up like a photofit, a combination of checked boxes, words or phrases, some kind of graphic, names, ages etc.

Once this identity has been formed, it then allows you to enter the realm of your choice and to act as this identity. This 'infofit' may be self-constructed, or thrust upon you, and already exists to varying degrees. From credit ratings and electronic tagging to e-mail and IRC nicknames —a collection of digital or electronic identities/representations of self which define limits of behaviour within certain (real or virtual) zones. The current slippery nature of the term 'user' (or identity) coincides with its increasing importance. As shifting or multiple and conflicting definitions pervade, and as electronic zones exert a greater presence in physical space, the architectural conception of 'user' will be forced to accommodate, negotiating real and virtual identities.

From a discussion of Habitat (http://www.digitalspace.com/avatars/):

What is an Avatar? It is your body double in Cyberspace, your presence in the virtual communities growing inside two and three dimensional virtual worlds online. With the book Avatars and this companion website, you can now leave simple chat rooms behind and venture forth into the true frontiers of virtual world Cyberspace. The AVVY awards show that avatars can be flowers and stars: http://millenium.simplenet.com/av99/avvys/av99.htm From UNC's Virtual University: http://horizon.unc.edu/TS/vu/1999-11.asp (Avatar Pedagogy, by Joel Foreman):

When the Internet was known only to an information technology elite, science fiction writer William Gibson (Neuromancer, 1984) depicted a computer network whose users projected their digital representatives (avatars) into a simulated world so lifelike that it was indistinguishable from the real thing. Although fully realizing this technovision may take 25 years (the guesstimate of networking savant James Crowe), developers have made enough progress to warrant a status report on the technology's emergence and its implications for the virtual university. In what follows I represent the current state of online avatar worlds, describe how I have used them to support instruction, and speculate about their potential for education.

From Neal Stephenson, Snow Crash, page 35:

As Hiro approaches the Street, he sees two young couples, probably using their parents' computers for a double date in the Metaverse, climbing down out of Port Zero, which is the local port of entry and monorail stop.

He is not seeing real people, of course. This is all a part of the moving illustration drawn by his computer according to the specifications coming down the fiber-optic cable. The people are pieces of software called avatars.

As used herein, an "avatar" is best understood as a graphical object in 2D or 3D, representing a persona of a consumer, appearing within a virtual environment. As the term is used in connection with our preferred embodiment (discussed in detail below), an avatar acts under the direct control of the consumer. However, it could be pre-programmed by the consumer to perform certain behaviors, or it could simply perform behaviors that are hardwired by the system. An avatar can take on the visual appearance of any living creature in humanoid, animal, plant, mythical, or other form, or it can be an animated depiction of a non-living thing such as a robot, vehicle, weapon, computer, constellation of stars, etc.

A virtual environment can be implemented using computer networks (known as "networked virtual environment") and other interactive media such as "interactive television." A "networked virtual environment" implements a virtual world, a 2D or 3D representation or simulation of a physical space. The networked virtual environment is accessible over a computer network or digital media network by multiple participants simultaneously, who may interact with the virtual world and with one another in near-real time. Similarly, an "interactive television" is conventional television content augmented with interactive facilities, usually delivered over a digital channel augmented by a back channel to the content broadcaster and by a terminal. Users and viewers can interact with the content via the terminal.

In the prior art, consumers participate in interactive online entertainment media through their avatars. This can take the form, for example, of "first-person" games, where the view of the virtual world is through the eyes of the avatar, as the central acting figure, or a third-person perspective (from the point of view of a third-party avatar or camera watching them). The networked virtual environment can be viewed by active participants whose avatars are within the environment, or alternatively, it may be viewed by non-participants who are not represented by an avatar in the environment.

The concept of "advertising" is also used throughout this application. For purposes hereof, the term "advertising" is used in a broad sense, and is intended to cover traditional advertisements, as well as the use of "brand marks," which can take the form of a corporate symbol or logo, a trademark, advertising text or copy, a graphical picture, or any multimedia element employed for the purposes either of advertising per se, or simply promoting or exposing a brand, trademark or service mark. Even when used alone without specific reference to branding and brand marks, the term "advertising" should be understood to refer to the use of such indicia as well as to traditional advertising.

It is well known in the prior art to finance the creation of interactive online entertainment media by various forms of paid advertising sponsorship. An online game may be sponsored ("brought to you by") a named sponsor, which will pay for the opportunity to be so identified. Alternately, advertisements may be embedded in the virtual world, much as billboards and the like are deployed in the real world. The use of such virtual billboard advertising is well established, for example in interactive sports gaming, such as simulated basketball, hockey, etc., wherein advertisements become part of the texture mapping for background panels such as walls and railing panels.

Moreover, there has been some deployment of advertising indicia on avatars themselves in a number of prior art online gaming formats. For example, as in real life, the cars in auto racing games often come emblazoned with advertising logos on their outer panels and surfaces, if for no other reason than realism.

In all of these prior art formats, however, despite the intended interactive format of the game, the participant is a relatively passive participant vis-à-vis the advertising. The advertising is in effect pushed or thrust upon a non-voluntary and often indifferent participant, who may become jaded to the experience and make an effort to ignore the advertising, or consider it part of the background. Even when the advertising is applied to the participant's own avatar (a race car, for example), the participant has no say in what advertising is applied, and no real interest in the issue.

BRIEF SUMMARY OF THE INVENTION

The present invention provides a way for sponsors to promote their brands or otherwise advertise products and services in virtual environments such as computer networks and other interactive media such as interactive television. The invention provides a way in which consumers choose sponsors' logos, names, commercial symbols or advertisements to appear on the avatars, virtual spaces and virtual objects that represent them within the virtual environments. The invention provides a mechanism for audience members (consumers) to choose the logo, names, commercial symbols or advertisements that appear on their avatars, it provides methods for deriving revenue from those choices, and provides mechanisms for tracking the usage of those logos, names, commercial symbols, or advertisements according to those methods.

The invention seeks to involve participants more directly in the matter of advertising, to incentivize them to adopt and deploy advertising, and to provide a source of revenues based thereon. It proposes to resolve or mitigate the conflict between the goals of user and the advertiser by providing a method of advertising that makes participants in the virtual world willing agents of the advertiser and advertising part of their activities in the virtual world.

Accordingly, objects of the present invention include:

Encouraging positive rather than negative consumer attitudes about advertising in the interactive online gaming environment by giving the consumers a positive role in the selection of advertising Further encouraging consumer adoption and deployment of advertising within the interactive online entertainment environment by providing financial and other incentives for users to adopt and deploy advertising indicia Developing advertising pricing models based on such methods of ad deployment Developing server pricing models for the consumer based on application of offsetting ad revenues Providing a mechanism for the consumer to display advertising for his/her own products and services Developing on-line events based on common chosen sponsorship Providing a means for consumers to become creative contributors to commercial advertising media Providing a means for user-selected advertising to become integrated with real world clothing, dress, stickers, billboards and posters.

It is a further object of the invention to provide means to collect data on consumer preferences without encountering the resistance to disclosing product and brand preferences commonly expressed by consumers in surveys and the like. Advertisers may be billed on a number of bases, including ad exposure.

These and other objects are accomplished in one embodiment of the invention by recruiting participants in particular virtual worlds to advertise a product or brand to the other participants and viewers in that virtual world. Each user entering a virtual world may select from a set of available advertisements, which can be displayed in association with the user's avatar in the virtual world. Users are incentivized to do this by the availability of rewards, such as coupons or real or virtual money or other resources, which are provided by the advertising sponsors, based on adoption of the advertising by the user, as well as on factors such as exposure of the selected advertisements to other users in the virtual world. By allowing the consumer to exercise advertising choice, this embodiment also facilitates collection of data regarding consumer preferences.

Other objects of the invention and the methods by which they are achieved will become evident from the drawings and detailed descriptions that follow.

BRIEF DESCRIPTION OF THE DRAWINGS

The following briefly describes the accompanying drawings:

FIGS. 4A, 4B and 4C show the database fields for users, advertisers and transactions, respectively, as used in an embodiment of the invention.

DETAILED DESCRIPTION OF THE PREFERRED EMBODIMENT

The preferred embodiment of the consumer-choice-avatar advertising-method is illustrated in FIGS. 1–5, and described in the text that follows. Although the following focuses on a particular embodiment of the invention, the claims appended to this application should not be interpreted as limited by the particular details disclosed in connection with that embodiment.

Figure 1:
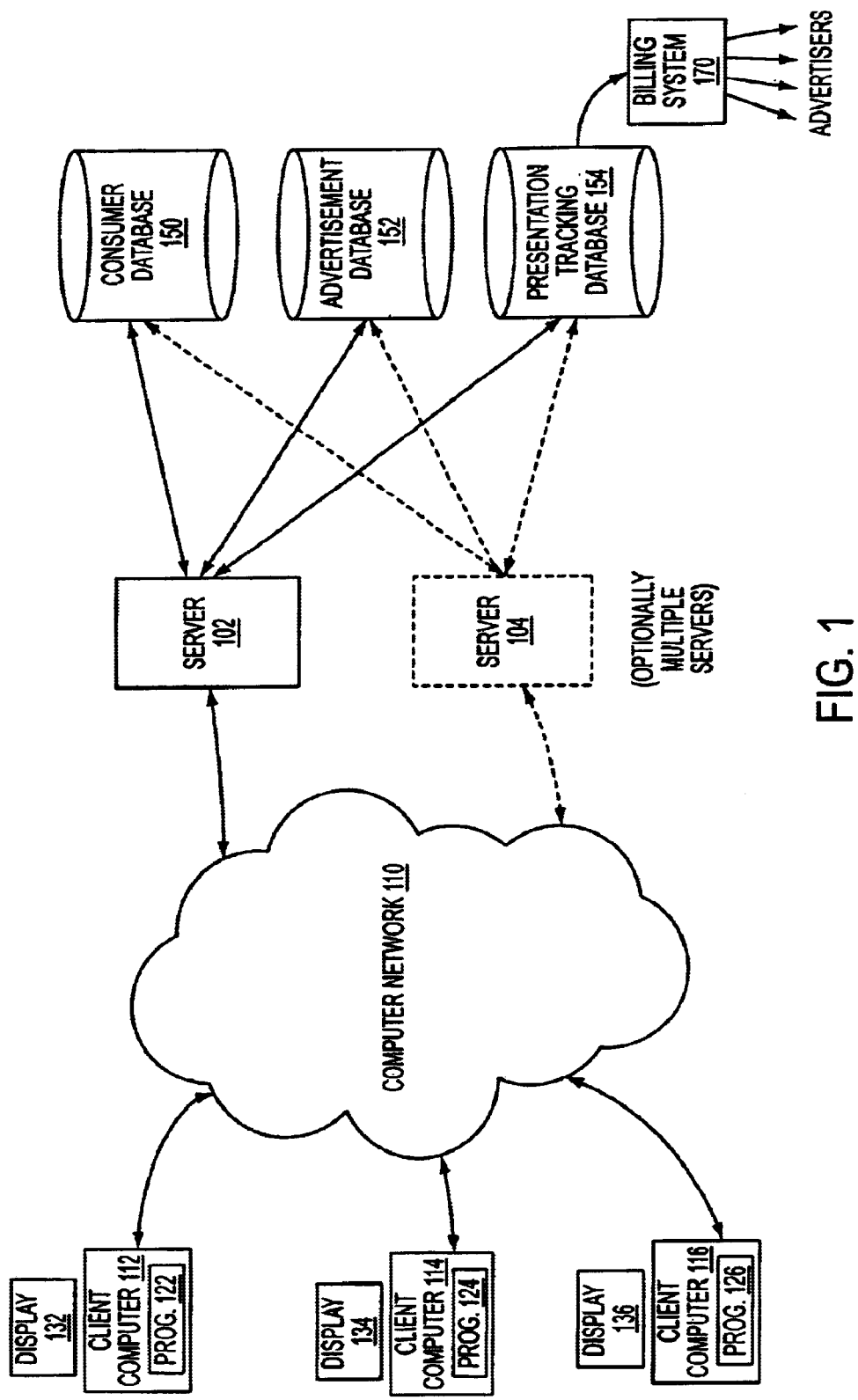
FIG. 1 shows a diagram of the network components, data repositories and their respective interconnections used in one embodiment of the invention.

Referring to FIG. 1, the networked virtual environment of one embodiment of the invention is generated on one or more servers 102, 104, etc. distributed over a computer network 110; received by participating consumers' computers 112, 114, 116, etc. by client computer programs 122, 124,, 126, etc. (which are of an animated graphical nature); and displayed on consumers' computer displays 132, 134, 136, etc. by those programs. The networked virtual environment is accessible over the computer network by multiple participants simultaneously.

The environment projected can be the setting for a networked (online) game or other online entertainment activity such as a virtual dance, virtual sporting event, life or fantasy simulation, networked gambling, etc. It can also be an online commerce setting such as a virtual store, virtual shopping mall, virtual town square, virtual trade show; or it can be an online communications setting such as chat, instant messaging, virtual meetings, virtual rallies, virtual conferences, etc. The host may also allow consumers to merely watch the virtual world go by on their client computers.

The networked virtual environment is typically supported by an ancillary support environment that uses the same network connectivity but is "outside" the virtual world, for example, menus, dialog boxes and control panels provided by client programs such as client program 122. While the FIG. 1 describes components of the networked virtual environment to project a setting for a networked game or other online entertainment activity, a virtual world can be implemented in other interactive media such as interactive television.

Figure 2A:
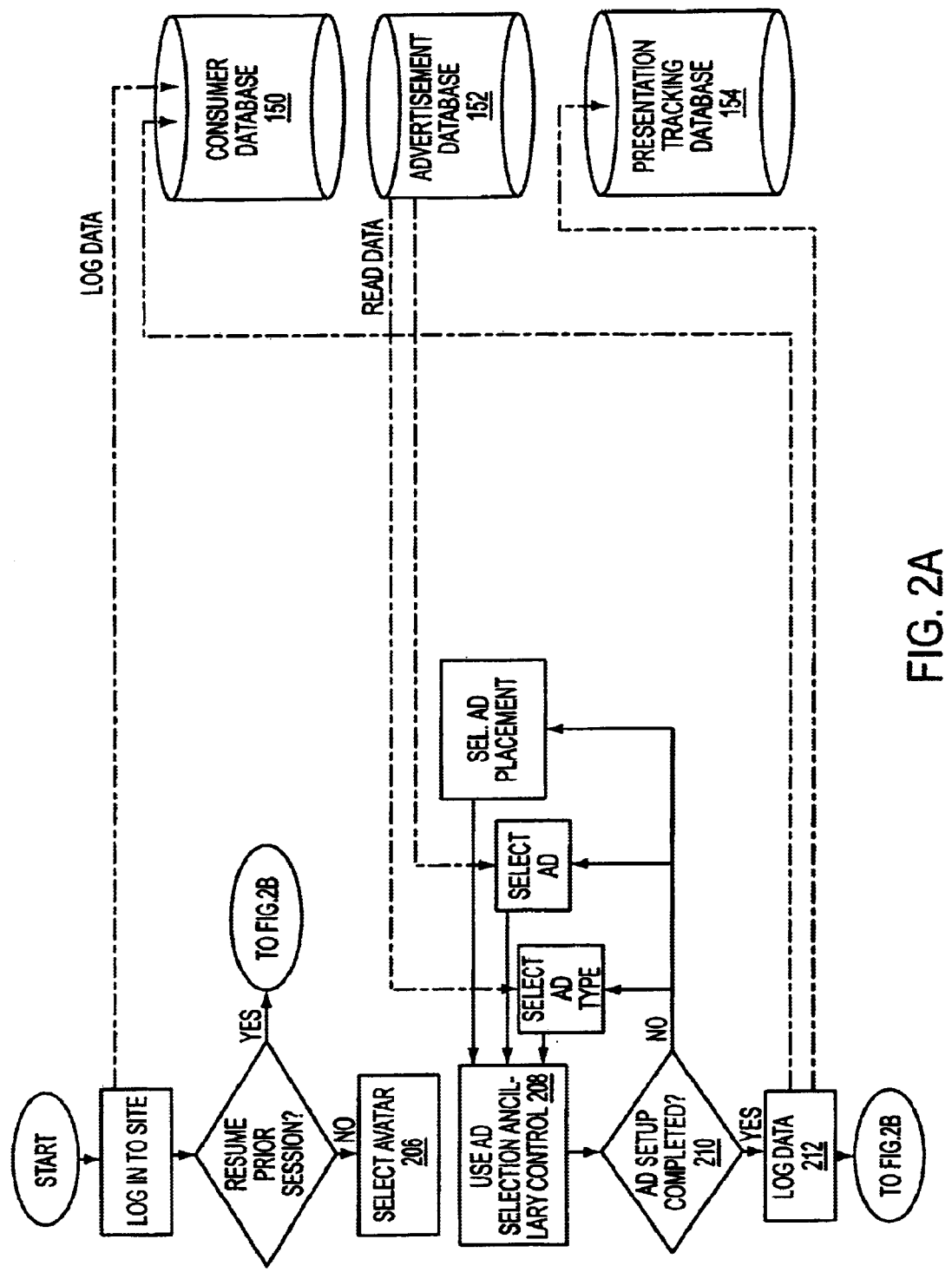
FIGS. 2A and 2B show a flowchart, for an embodiment of the invention, of a consumer's experience in using an embodiment of the invention.
Figure 2B:
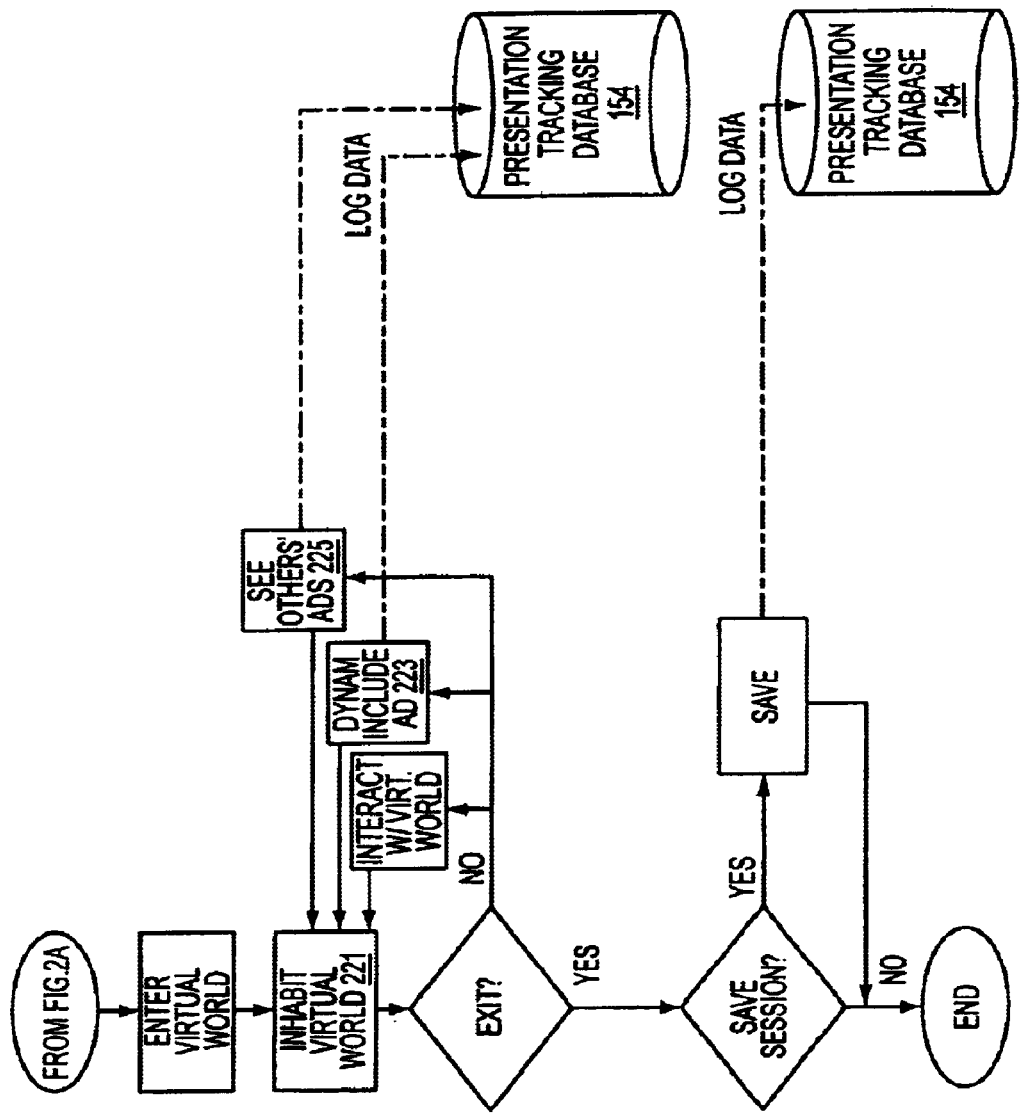
Figure 3:
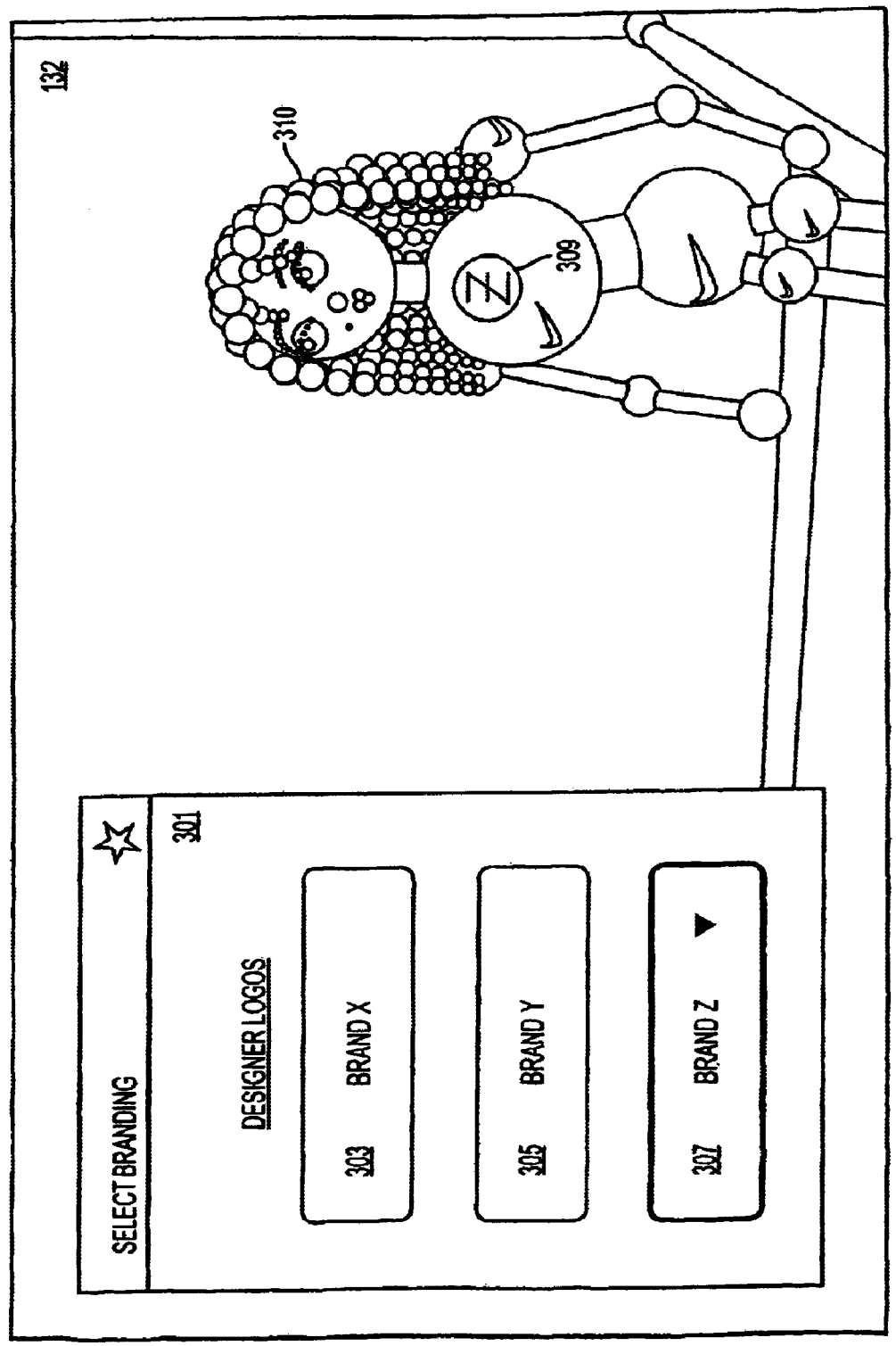
FIG. 3 shows a sample branding selection screen as used in one embodiment of the invention.

When participating in the virtual world, consumers are exposed to the images and sounds of their own and other consumers' avatars interacting with one another in the virtual environment. A flow chart depicting a simple course of interaction between a user and this embodiment of the invention is shown in FIGS. 2A and 2B. The user selects a presentation location (206) on an avatar on which an advertisement or advertisements will appear. This may be permitted within the ancillary support environment, within the virtual environment, or both. When creating or modifying their avatars, users are presented with multiple choices for the advertisements that will be displayed on the avatars. The user selects (208) one or more advertisements to appear in pre-designated parts of the avatars, or they place the advertisements on the avatars. For example, as shown in FIG. 3, the user is provided an ancillary dialog box 301 with "Designer Logo" selections 303, 305, 307 (read from advertisement database 152 in FIG. 2A) that may be selected with a mouse and dragged onto an appropriate location (309) on the clothing of avatar 310. Alternately, the user could find appropriate branded materials in the virtual world, and apply them by taking actions solely in that world. Preferably, the advertisement will be associated with a display mode constraint to require it to be displayed in the specified manner and orientation, and preferably further in a manner that makes its association with the avatar of the consumer who selected the advertisement obvious to most participants The advertising selection ancillary control (such as dialog box 301) may also specify how the advertisement will be displayed if selected, the amount of control the consumer may exercise over the time and manner of the display, what rewards will be given to the consumer for displaying each advertisement, and the variables upon which the nature and size of the reward depend.

The user performs the selection and placement process by using the client computer programs (122, etc. in FIG. 1). When the user indicates s/he is satisfied with the selection (210 in FIG. 2A), the relevant information is transmitted to the server(s) 102, 104 and stored in consumer database 150 and presentation tracking database 154. Then, whenever the servers cause the avatar representing that user to appear in the networked virtual environment (221), the relevant advertisements are dynamically included (223) in the presentation of the avatar within the networked virtual environment. Other users whose avatars are nearby in the virtual world thus "see" this advertisement. The user also sees (225) ads placed by other users on or in connection with their avatars. Server(s) 102, 104 cause the exposure of advertisements in this manner to be logged in databases 150,154.

Figure 5:
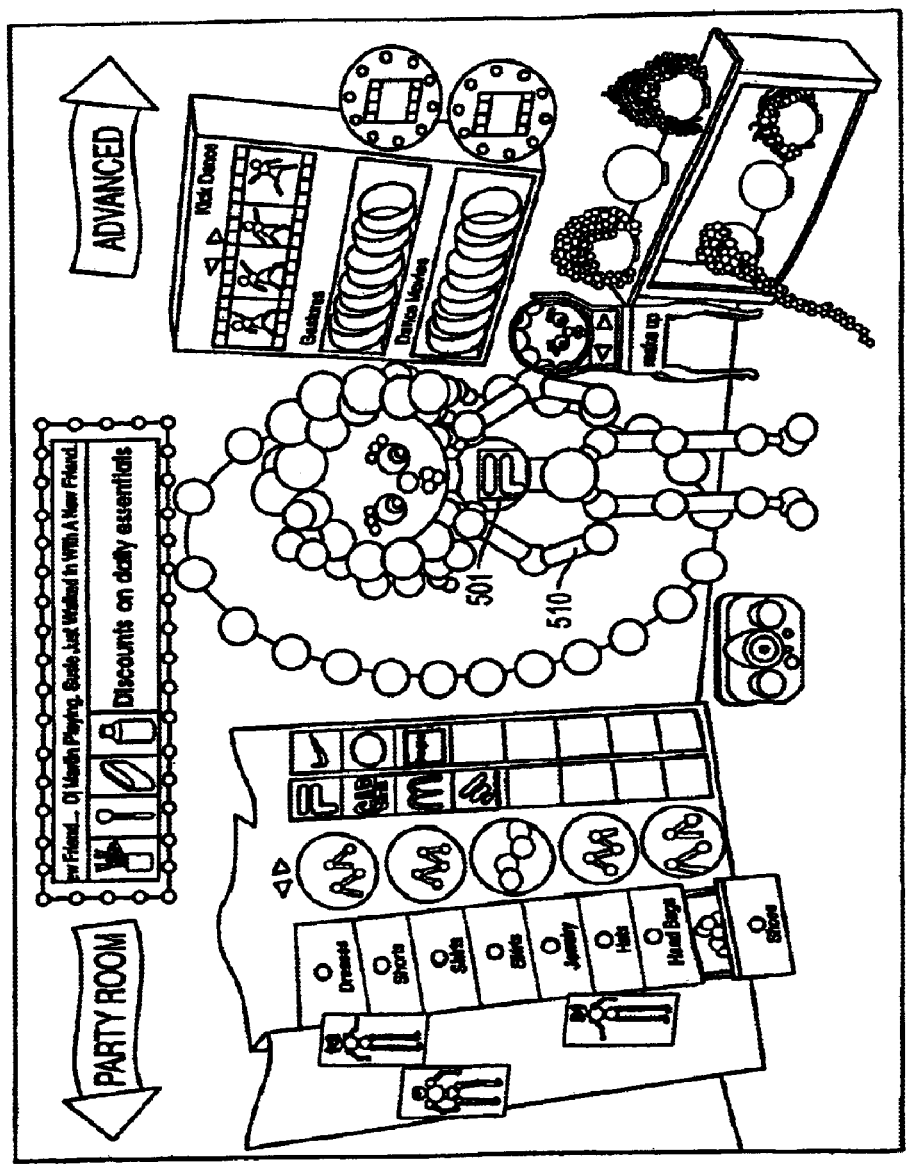
FIG. 5 shows a scene from a game in accordance with one embodiment of the invention, in which a player's avatar is wearing an item of clothing with a player-selected designer logo.

If the advertisement(s) are purely graphical in nature, they are texture-mapped onto the 2D avatar image or 3D avatar form. If they contain audio or animation or other multimedia elements, these elements are played as part of the avatars' behavior at times designated by the user or determined by the system. FIG. 5 shows a screen from an embodiment of the invention in which branding 501 is displayed on avatar 510, which is engaged in animated activity within the virtual world (dressing for a party).

The time and manner of the display of the selected advertisement can be determined entirely by the consumer, or be at least partially controlled by server(s) 102, 104. For example, a corporate logo could be available for display on a cap worn by an avatar, an audio sequence could be available to play each time an avatar performs a specified action, such as waving, and a musical routine could be available for an avatar to perform whenever the consumer controlling the avatar chooses. The advertisement may be created by any party commissioned to do so by the advertiser, including the consumers themselves. Consumers might be encouraged to submit ideas to the host or the advertiser regarding advertisements that could be made available for display in the virtual world. Consumers might also themselves be advertisers, and submit and place their own advertising.

Figure 6:
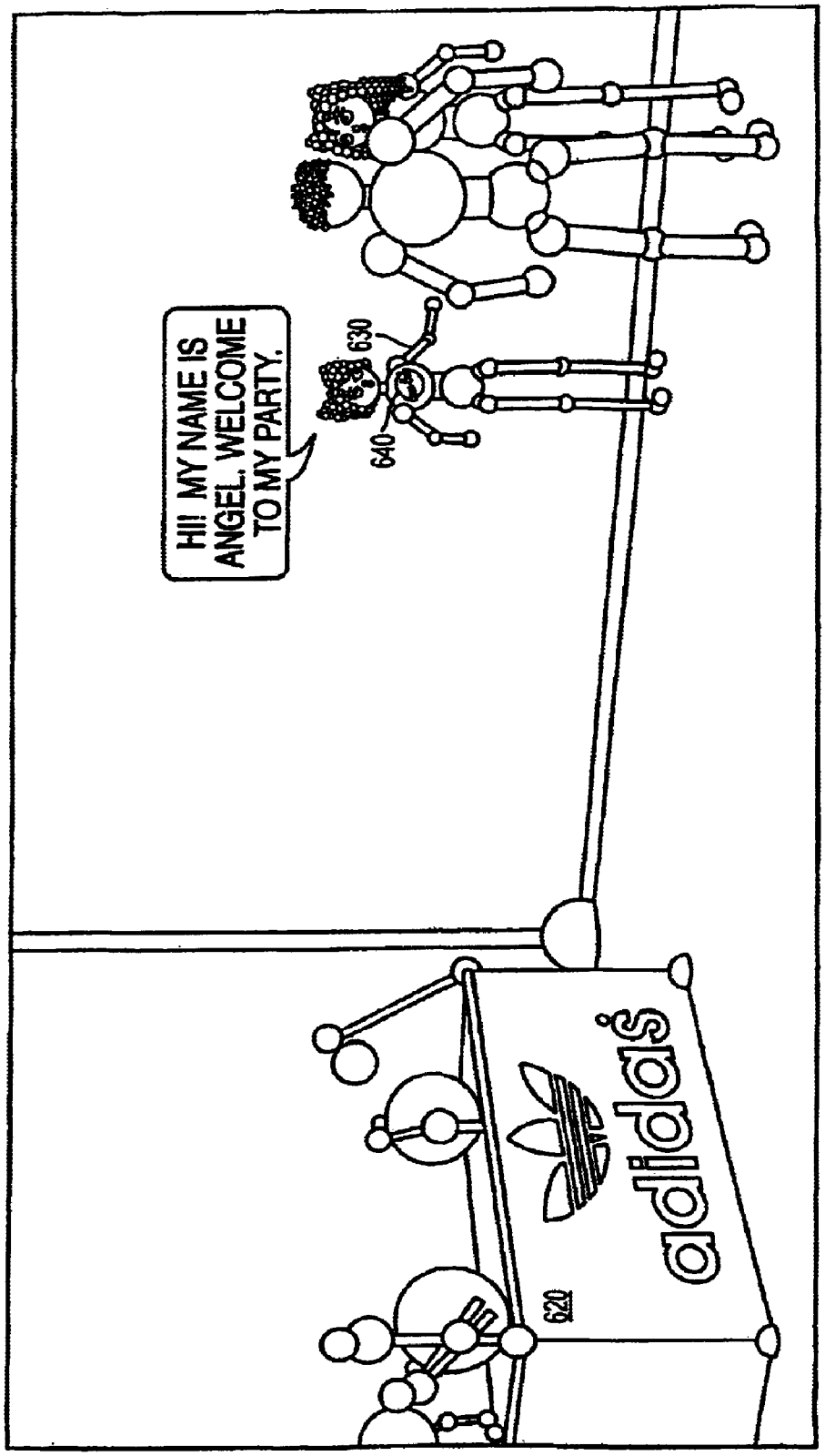
FIG. 6 shows a scene from a virtual activity in accordance with one embodiment of the invention, in which a player has selected to put a logo on the player's avatar and an Addidas sign on a box in a virtual space.

In addition, placement of advertising is not limited to placement by users on their avatars. For example, a poster advertising a product could be available for display in a virtual space controlled or shared by an avatar, such as the avatar's room or studio. For example, FIG. 6 shows a screen from an embodiment of the invention in which an avatar 630 is engaged in animated activity within the virtual world. The consumer has named the avatar 630 as Angel, and s/he has selected to place a logo on her body 640. The consumer has also selected to place an Addidas sign on a box 620 in a virtual space. If the advertisement(s) are purely graphical in nature, they are texture-mapped onto the 2D image or 3D form in virtual spaces. If they contain audio or animation or other multimedia elements, these elements are played at times designated by the user or determined by the system.

Another aspect of the invention is that users may be given incentives for choosing to include advertisements on their avatars. In exchange for choosing a particular advertisement, the consumer may be awarded units of money, credits or coupons that can be applied towards buying whole or fractional goods and services (in the real or virtual world), clues for winning games and contests, or other information or opportunities with perceived value. In one embodiment, the invention provides a mechanism for money or credits to be deducted directly from the sponsor's account, though this is optional.

Rewards may accrue to a user simply for the act of choosing an advertisement. At a minimum, the user him/herself is exposed to the ad as a result, and the potential created for later exposure to other avatars. The size of the reward may depend on criteria such as exposure (measured or anticipated) of the advertisement to the audience, as measured in number of consumers in the environment, the number of non-participants viewing the environment, the number of minutes the avatar displays the advertisement in the environment, or some combination of these. Rewards might also take into account the avatar's status in the virtual world, such as the amount of land or other relevant resources accumulated in a multi-player game of conquest, or elements in the consumer's profile in the consumer database 150. An advertiser may also reward consumers for submitting for the advertiser's consideration designs for inclusion in the list of advertisements available for selection and display by other consumers in the virtual world. Further, user rewards could be based in whole or in part on a proportion of the compensation paid to the host by the advertiser whose advertisement has been selected, or on any other criterion deemed suitable by the advertiser or the host proprietor.

Moreover, host and advertiser could structure the rewards with a view toward increasing traffic to and average time spent in the particular virtual world. For example, the size of the reward could increase with the amount of time spent displaying the advertisement, and thus with the amount of time spent in the virtual world. The consumer presumably will take into account the reward structure in making decisions regarding his/her participation in the virtual world. The decisions of interest to the host are recorded in the presentation tracking database 154.

Depending on the nature of the reward, distribution of the rewards to users will be handled in the virtual or in the real world. Increasing the credit an avatar may draw on in a virtual casino would likely be done entirely in the virtual world, while awarding product samples would require mailing those samples in the real world, just as awarding frequent flier miles would require updating the consumer's account stored in a computer that is not necessarily part of the virtual world. The host may establish appropriate ancillary systems of well-known types to handle such tasks.

Server(s) 102, 104 maintain several databases, including customer database 150 and presentation tracking database 154 mentioned above, as well as advertising database 152. FIGS. 4A, 4B and 4C show the database fields for users, advertisers and transactions, respectively, as used in an embodiment of the invention.

The server(s) 102, 104 will track and record in the appropriate database, 152, information relevant to billing an advertiser, such as the total time 433 that the avatar (438) displays an advertisement 431 in the environment 432, the number of other avatars that are visually exposed to the advertisement 434, the number of non-participant viewers who are visually exposed to the advertisement 436, or the total times of these exposures 438. This information will be stored in presentation tracking database 154 by the server. Off line programs (shown in FIG. 1 as billing system 170) will use this information to generate information for billing the advertisers. (Alternatively, the client software can track this information, and transmit it periodically to the server. This approach is not preferred, however, as it is rather readily subject to hacking.)

Consumer database 150 includes profiles of consumers (401) who have participated or have expressed an intention to participate in the particular virtual world. It includes user registration information (402–405). The consumer database may include information (406) necessary to allow a consumer to pick up where s/he previously left the virtual world by storing information about her/his-avatar and its recent activities. The database may also be used to assemble information about the consumer from any kind of virtual or real world source to allow the advertisers to better target their advertisements and reward offers 407. Consistent with privacy obligations and commitments, the host may want to keep track of various data relating to a consumer's participation in the virtual world, such as the actions of the user's avatar, the user's purchases, the amount of time the consumer spends in the virtual world, the scores or other quantification of accomplishment achieved by the avatar in a game, as well as the consumer's choices with respect to the advertisements offered to him/her for display in the virtual world 408. The host may also want to use aggregates of these data to update the consumer's profile in the consumer database 150.

The advertisement database 152 includes an ID (421) for each advertisement available for selection by the consumer. The advertisement may include text, symbols such as corporate logos, graphic elements such as pictures of a product, video or animation sequences, audio elements, or any other multimedia elements designed to enhance a particular brand, to create consumer awareness of a particular product or the consumer's need for it, to promote sales of a particular product, or to promote awareness of a particular source of consumer goods. If the advertisement is being served externally, an appropriate address or pointer is placed in the database. The advertisement may be as simple as branding or as complex as a video/audio sequence in the style of a television commercial. The advertisement database also includes information on how the advertisement will be displayed once it is selected by a consumer.

To derive revenue from the advertisements, the host of the networked virtual environment can do one or more of the following:

Charge the advertiser based upon exposure (measured or anticipated) of the advertisement to the audience, as measured in number of consumers in the environment, the number of non-participants viewing the environment, the number of minutes the avatar displays the advertisement in the environment, or some combination of these.

Charge the advertiser a fixed or time-variable fee for its advertisements to be included in the set of advertisements that the consumer can choose from.

Charge the consumer a fee which is passed in part onto the sponsor as a licensing fee or royalty Factors determining the fee to the advertiser may also include the make-up of the pool of participants in the virtual world, the hours of the day during which avatars display the advertisement, the complexity of the advertisement, the number of times a particular advertisement was selected in a given period of time, the total time that avatars display the advertisement, and the actual or anticipated number of participant and/or observer consumers exposed to the advertisement.

The actual billing of the advertiser may be handled using a billing support system 170 that uses information obtained from databases 150, 152 and 154 to calculate the fee owed by the various advertisers in accordance with the applicable factors as discussed above.

There are a number of other benefits that may result from consumer-chosen avatar advertising in accordance with the present invention. When selecting a particular advertisement, the consumer not only confirms his/her own interest in a particular product or his/her allegiance to a particular brand, but also (i) becomes an advertising subject, and (ii) becomes an vehicle for delivering advertising to the other consumers participating in the world. For these other consumers, the advertisement displayed by this avatar contains information about the interests and beliefs of the consumer who is represented by this avatar, or the role this consumer wants his/her avatar to play. Thus, noticing the advertisements displayed by the various avatars could further the consumers' intentions in participating in the virtual world in the first place. For example, the particular advertisement displayed by an avatar could become a conversation opener in a chatroom, or a basis for choosing allies in a multi-player game.

Other applications of the present invention could include the following:

"Advertisements" promoting anything at all can be constructed by user-participants for other user-participants to use. All the compensation schemes discussed above can be applied, with virtual-world money or possibly realworld money.

User-participants can organize sponsored events (perhaps only open to avatars sporting the appropriate advertisement) in the virtual world and receive compensation for this.

User-participants can construct novel advertisements (on behalf of real-world advertisers) that are appropriate to the networked virtual world. These can be submitted electronically to the advertiser for approval. If approved, they would become available for consumers to place on their avatars. Optionally, the constructor of the approved advertisement could receive compensation from the advertiser based on any of the above compensation schemes.

The display may be wearable and connected via wireless connection to the client computer, and the wearer of the display may select an advertisement to be displayed for other real-world people to see, with compensation determined as above.

The display and computer may both be wearable, with the computer connected via wireless connection to the network, and the wearer of the display may select an advertisement to be displayed for other real-world people to see, with compensation determined as above.

It is evident that an advertising method has been developed that accomplishes the stated objects of the invention. It will be apparent to those skilled in the art that the method of the present invention is readily adaptable to systems other than those herein described. Such adaptations and variations do not depart from the scope and spirit of the invention, as defined in the following claims.

We claim:

1. A method for selected advertising in a virtual world, comprising:

providing one or more advertisements to a participant, wherein users of said virtual world include said participant;

receiving at least one selection of said one or more advertisements from said participant;

providing one or more locations for said participant to choose to display said one or more advertisements in said virtual world;

receiving at least one selection of said one or more locations from said participant;

creating a selected advertisement from said at least one selection of said one or more advertisements and said at least one selection of said one or more locations;

providing for display to at least one of said users said selected advertisement in said virtual world, wherein said users are participants in said virtual world or viewers of said virtual world; and providing a reward to at least said participant, wherein said reward is based on at least said providing for display to at least one of said users.

2. The method of claim 1, wherein providing a reward comprises:

tracking one or more interactions with said selected advertisement by said at least one of said users; and providing a reward to at least said participant, wherein said reward is based on at least said one or more interactions.

3. The method of claim 2, wherein said one or more interactions includes viewing of said selected advertisement by said at least one of said users.

4. The method of claim 1, wherein said participant creates at least one of said one or more advertisements.

5. The method of claim 4, wherein said participant's creation of said one or more advertisements is provided in at least one of i) said virtual world or ii) one or more ancillary support environments.

6. The method of claim 1, wherein said participant's selection of said one or more advertisements is provided in at least one of i) said virtual world or ii) one or more ancillary support environments.

7. The method of claim 1, wherein said participant's selection of said one or more locations is provided in at least one of i) said virtual world or ii) one or more ancillary support environments.

8. The method of claim 2, wherein said one or more interactions occurs in at least one of a computer game, a video game, an online chat, an instant message, or one or more virtual scenes.

9. The method of claim 8, wherein said one or more virtual scenes include at least one of a dance, party, sporting event, gambling event, meeting, shopping mall, town square, trade show, rally, conference, life simulation, or fantasy simulation.

10. The method of claim 2, wherein said tracking includes gathering information about at least one of (i) providing said one or more advertisements to said participant, (ii) receiving said at least one selection of said one or more advertisements from said participant, (iii) providing said one or more locations for said participant to chose to display said one or more advertisements, (iv) receiving said at least one selection of said one or more locations, (v) providing for said display to said at least one of said users said selected advertisement, (vi) said participant, (vii) said one or more advertisements included in said selected advertisement, or (viii) said selected advertisement's display to at least one user.

11. The method of claim 10, further comprising: providing information based on said tracking to at least one of a host, an advertiser, said participant, or at least one of said users.

12. The method of claim 10, wherein said information about said selected advertisement's display includes at least one of (i) a measured display time of said selected advertisement to said at least one user, (ii) a number of said at least one user that viewed said selected advertisement, (iii) anticipated display time of said selected advertisement to said at least one user, (iv) said one or more locations of each of said one or more advertisements, or (v) information on exposure of said one or more advertisements to said at least one user.

13. The method of claim 1, wherein said one or more rewards include at least one of coupons, merchandise, credits, goods, services, information about said virtual world, opportunities in said virtual world, real money, or virtual money.

14. The method of claim 1, further comprising:
creating a consumer profile for said participant, wherein said consumer profile includes at least one of (a) registration information, (b) environment continuation information to allow said participant to continue where said participant previously left in said virtual world, (c) information on one or more said selected advertisements of said participant, (d) information on said at least one selection of said one or more advertisements, or (e) information on said at least one selection of said one or more locations, or (f) reward information.

15. The method of claim 1, wherein said one or more advertisements are located on at least one of an avatar, a virtual space, or a virtual object of said participant within said virtual world.

16. The method of claim 1, wherein said virtual world is implemented by interactive media.

17. The method of claim 16, wherein said interactive media is provided by at least one of (a) one or more servers and one or more databases, or (b) interactive television.

18. The method of claim 1, wherein said one or more advertisements are displayed at least at one of (i) times designated by said participant, or (ii) times designated by at least one of a host or an advertiser.

19. The method of claim 1, wherein said one or more advertisements include at least one of (a) text, (b) symbols, (c) graphics, (d) graphics that are texture-mapped in said virtual world, or (e) multimedia elements of audio, video, and animation.

20. The method of claim 1, wherein said one or more advertisements include at least one of (a) corporate symbols, (b) logos, (c) trademarks, (d) advertising text or copy, (e) graphical pictures, or (f) multimedia elements.

21. The method of claim 2, further comprising:
logging said one or more interactions of said at least one user.

22. The method of claim 21, wherein said logging is performed by one or more servers.

23. The method of claim 2, further comprising:
reporting information based on said one or more interactions to an advertiser.

24. The method of claim 1, wherein said one or more advertisements are created by an advertiser.

25. The method of claim 1, wherein said one or more advertisements are provided by an advertiser.

26. The method of claim 1, wherein said one or more advertisements are provided by said participant and approved by an advertiser.

27. The method of claim 2, further comprising:
billing an advertiser in connection with said one or more interactions.

28. A method for selected advertising in a virtual world, comprising:
providing one or more advertisements to a participant, wherein users of said virtual world include said participant;
receiving at least one selection of said one or more advertisements from said participant;
providing one or more locations for said participant to choose to display said one or more advertisements in said virtual world;
receiving at least one selection of said one or more locations from said participant;
creating a selected advertisement from said at least one selection of said one or more advertisements and said at least one selection of said one or more locations;
providing for display to at least one of said users said selected advertisement in said virtual world, wherein said users are participants in said virtual world or viewers of said virtual world; and
providing a reward to at least one of a host or an advertiser, wherein said reward is based on at least one of (i) providing said one or more advertisements to said participant, (ii) receiving said at least one selection of said one or more advertisements from said participant, (iii) providing said one or more locations for said participant to choose to display said one or more advertisements, (iv) receiving said at least one selection of said one or more locations, or (v) providing for said display to said at least one of said users said selected advertisement.

29. The method of claim 28, wherein providing a reward comprises:
tracking one or more interactions with said selected advertisement by said at least one of said users; and
providing a reward to said at least one of a host or an advertiser, wherein said reward is based on at least said one or more interactions.

30. The method of claim 29, wherein said one or more interactions includes viewing of said selected advertisement by said at least one of said users.

31. The method of claim 28, wherein said participant creates at least one of said one or more advertisements.

32. The method of claim 31, wherein said participant's creation of said one or more advertisements is provided in at least one of i) said virtual world or ii) one or more ancillary support environments.

33. The method of claim 28, wherein said participant's selection of said one or more advertisements is provided in at least one of i) said virtual world or ii) one or more ancillary support environments.

34. The method of claim 28, wherein said participant's selection of said one or more locations is provided in at least one of i) said virtual world or ii) one or more ancillary support environments.

35. The method of claim 29, wherein said one or more interactions occurs in at least one of a computer game, a video game, an online chat, an instant message, or one or more virtual scenes.

36. The method of claim 35, wherein said one or more virtual scenes include at least one of a dance, party, sporting event, gambling event, meeting, shopping mall, town square, trade show, rally, conference, life simulation, or fantasy simulation.

37. The method of claim 29, wherein said tracking includes gathering information about at least one of (i) providing said one or more advertisements to said participant, (ii) receiving said at least one selection of said one or more advertisements from said participant, (iii) providing said one or more locations for said participant to chose to display said one or more advertisements, (iv) receiving said at least one selection of said one or more locations, (v) providing for said display to said at least one of said users said selected advertisement, (vi) said participant, (vii) said one or more advertisements included in said selected advertisement, or (viii) said selected advertisement's display to at least one user.

38. The method of claim 37, further comprising:
providing information based on said tracking to at least one of a host, an advertiser, said participant, or at least one of said users.

39. The method of claim 37, wherein said information about said selected advertisement's display includes at least one of (i) a measured display time of said selected advertisement to said at least one user, (ii) a number of said at least one user that viewed said selected advertisement, (iii) anticipated display time of said selected advertisement to said at least one user, (iv) said one or more locations of each of said one or more advertisements, or (v) information on exposure of said one or more advertisements to said at least one user.

40. The method of claim 28, wherein said one or more rewards include at least one of coupons, merchandise, credits, goods, services, information about said virtual world, opportunities in said virtual world, real money, or virtual money.

41. The method of claim 28, further comprising:
creating a consumer profile for said participant, wherein said consumer profile includes at least one of (a) registration information, (b) environment continuation information to allow said participant to continue where said participant previously left in said virtual world, (c) information on one or more said selected advertisements of said participant, (d) information on said at least one selection of said one or more advertisements, or (e) information on said at least one selection of said one or more locations, or (f) reward information.

42. The method of claim 28, wherein said one or more advertisements are located on at least one of an avatar, a virtual space, or a virtual object of said participant within said virtual world.

43. The method of claim 28, wherein said virtual world is implemented by interactive media.

44. The method of claim 43, wherein said interactive media is provided by at least one of (a) one or more servers and one or more databases, or (b) interactive television.

45. The method of claim 28, wherein said one or more advertisements are displayed at least at one of (i) times designated by said participant, or (ii) times designated by at least one of a host or an advertiser.

46. The method of claim 28, wherein said one or more advertisements include at least one of (a) text, (b) symbols, (c) graphics, (d) graphics that are texture-mapped in said virtual world, or (e) multimedia elements of audio, video, and animation.

47. The method of claim 28, wherein said one or more advertisements include at least one of (a) corporate symbols, (b) logos, (c) trademarks, (d) advertising text or copy, (e) graphical pictures, or (f) multimedia elements.

48. The method of claim 29, further comprising:
logging said one or more interactions of said at least one user.

49. The method of claim 48, wherein said logging is performed by one or more servers.

50. The method of claim 29, further comprising:
reporting information based on said one or more interactions to an advertiser.

51. The method of claim 28, wherein said one or more advertisements are created by an advertiser.

52. The method of claim 28, wherein said one or more advertisements are provided by an advertiser.

53. The method of claim 28, wherein said one or more advertisements are provided by said participant and approved by an advertiser.

54. The method of claim 29, further comprising:
billing an advertiser in connection with said one or more interactions.

55. A system for selected advertising in a virtual world, comprising:
first means for providing one or more advertisements to a participant, wherein users of said virtual world include said participant;
first means for receiving at least one selection of said one or more advertisements from said participant;
second means for providing one or more locations for said participant to choose to display said one or more advertisements in said virtual world;
second means for receiving at least one selection of said one or more locations from said participant;
first means for creating a selected advertisement from said at least one selection of said one or more advertisements and said at least one selection of said one or more locations;
third means for providing for display to at least one of said users said selected advertisement in said virtual world, wherein said users are participants in said virtual world or viewers of said virtual world; and
fourth means for providing a reward to at least said participant, wherein said reward is based on at least said providing for display to at least one of said users.

56. The system of claim 55, wherein said fourth means for providing a reward comprises:
means for tracking one or more interactions with said selected advertisement by said at least one of said users; and
fifth means for providing a reward to at least said participant, wherein said reward is based on at least said one or more interactions.

57. The system of claim 56, wherein said one or more interactions includes viewing of said selected advertisement by said at least one of said users.

58. The system of claim 55, wherein said participant creates at least one of said one or more advertisements.

59. The system of claim 58, wherein said participant's creation of said one or more advertisements is provided in at least one of i) said virtual world or ii) one or more ancillary support environments.

60. The system of claim 55, wherein said participant's selection of said one or more advertisements is provided in at least one of i) said virtual world or ii) one or more ancillary support environments.

61. The system of claim 55, wherein said participant's selection of said one or more locations is provided in at least one of i) said virtual world or ii) one or more ancillary support environments.

62. The system of claim 56, wherein said one or more interactions occurs in at least one of a computer game, a video game, an online chat, an instant message, or one or more virtual scenes.

63. The system of claim 62, wherein said one or more virtual scenes include at least one of a dance, party, sporting event, gambling event, meeting, shopping mall, town square, trade show, rally, conference, life simulation, or fantasy simulation.

64. The system of claim 56, wherein said means for tracking includes gathering information about at least one of (i) providing said one or more advertisements to said participant, (ii) receiving said at least one selection of said one or more advertisements from said participant, (iii) providing said one or more locations for said participant to chose to display said one or more advertisements, (iv) receiving said at least one selection of said one or more locations, (v) providing for said display to said at least one of said users said selected advertisement, (vi) said participant, (vii) said one or more advertisements included in said selected advertisement, or (viii) said selected advertisement's display to at least one user.

65. The system of claim 64, further comprising:
sixth means for providing information based on said tracking to at least one of a host, an advertiser, said participant, or at least one of said users.

66. The system of claim 64, wherein said information about said selected advertisement's display includes at least one of (i) a measured display time of said selected advertisement to said at least one user, (ii) a number of said at least one user that viewed said selected advertisement, (iii) anticipated display time of said selected advertisement to said at least one user, (iv) said one or more locations of each of said one or more advertisements, or (v) information on exposure of said one or more advertisements to said at least one user.

67. The system of claim 55, wherein said one or more rewards include at least one of coupons, merchandise, credits, goods, services, information about said virtual world, opportunities in said virtual world, real money, or virtual money.

68. The system of claim 55, further comprising:
second means for creating a consumer profile for said participant, wherein said consumer profile includes at least one of (a) registration information, (b) environment continuation information to allow said participant to continue where said participant previously left in said virtual world, (c) information on one or more said selected advertisements of said participant, (d) information on said at least one selection of said one or more advertisements, or (e) information on said at least one selection of said one or more locations, or (f) reward information.

69. The system of claim 55, wherein said one or more advertisements are located on at least one of an avatar, a virtual space, or a virtual object of said participant within said virtual world.

70. The system of claim 55, wherein said virtual world is implemented by interactive media.

71. The system of claim 70, wherein said interactive media is provided by at least one of (a) one or more servers and one or more databases, or (b) interactive television.

72. The system of claim 55, wherein said one or more advertisements are displayed at least at one of (i) times designated by said participant, or (ii) times designated by at least one of a host or an advertiser.

73. The system of claim 55, wherein said one or more advertisements include at least one of (a) text, (b) symbols, (c) graphics, (d) graphics that are texture-mapped in said virtual world, or (e) multimedia elements of audio, video, and animation.

74. The system of claim 55, wherein said one or more advertisements include at least one of (a) corporate symbols, (b) logos, (c) trademarks, (d) advertising text or copy, (e) graphical pictures, or (f) multimedia elements.

75. The system of claim 56, further comprising:
means for logging said one or more interactions of said at least one user.

76. The system of claim 75, wherein said means for logging is performed by one or more servers.

77. The system of claim 56, further comprising: means for reporting information based on said one or more interactions to an advertiser.

78. The system of claim 55, wherein said one or more advertisements are created by an advertiser.

79. The system of claim 55, wherein said one or more advertisements are provided by an advertiser.

80. The system of claim 55, wherein said one or more advertisements are provided by said participant and approved by an advertiser.

81. The system of claim 56, further comprising:
means for billing an advertiser in connection with said one or more interactions.

82. A system for selected advertising in a virtual world, comprising:
first means for providing one or more advertisements to a participant, wherein users of said virtual world include said participant;
first means for receiving at least one selection of said one or more advertisements from said participant;
second means for providing one or more locations for said participant to choose to display said one or more advertisements in said virtual world;
second means for receiving at least one selection of said one or more locations from said participant;
first means for creating a selected advertisement from said at least one selection of said one or more advertisements and said at least one selection of said one or more locations;
third means for providing for display to at least one of said users said selected advertisement in said virtual world, wherein said users are participants in said virtual world or viewers of said virtual world; and
fourth means for providing a reward to at least one of a host or an advertiser, wherein said reward is based on at least one of (i) providing said one or more advertisements to said participant, (ii) receiving said at least one selection of said one or more advertisements from said participant, (iii) providing said one or more locations for said participant to choose to display said one or more advertisements, (iv) receiving said at least one selection of said one or more locations, or (v) providing for said display to said at least one of said users said selected advertisement.

83. The system of claim 82, wherein fourth means for providing a reward comprises:
   means for tracking one or more interactions with said selected advertisement by said at least one of said users; and
   fifth means for providing a reward to said at least one of a host or an advertiser, wherein said reward is based on at least said one or more interactions.

84. The system of claim 83, wherein said one or more interactions includes viewing of said selected advertisement by said at least one of said users.

85. The system of claim 82, wherein said participant creates at least one of said one or more advertisements.

86. The system of claim 85, wherein said participant's creation of said one or more advertisements is provided in at least one of i) said virtual world or ii) one or more ancillary support environments.

87. The system of claim 82, wherein said participant's selection of said one or more advertisements is provided in at least one of i) said virtual world or ii) one or more ancillary support environments.

88. The system of claim 82, wherein said participant's selection of said one or more locations is provided in at least one of i) said virtual world or ii) one or more ancillary support environments.

89. The system of claim 83, wherein said one or more interactions occurs in at least one of a computer game, a video game, an online chat, an instant message, or one or more virtual scenes.

90. The system of claim 89, wherein said one or more virtual scenes include at least one of a dance, party, sporting event, gambling event, meeting, shopping mall, town square, trade show, rally, conference, life simulation, or fantasy simulation.

91. The system of claim 83, wherein said means for tracking includes gathering information about at least one of (i) providing said one or more advertisements to said participant, (ii) receiving said at least one selection of said one or more advertisements from said participant, (iii) providing said one or more locations for said participant to chose to display said one or more advertisements, (iv) receiving said at least one selection of said one or more locations, (v) providing for said display to said at least one of said users said selected advertisement, (vi) said participant, (vii) said one or more advertisements included in said selected advertisement, or (viii) said selected advertisement's display to at least one user.

92. The system of claim 91, further comprising:
   sixth means for providing information based on said tracking to at least one of a host, an advertiser, said participant, or at least one of said users.

93. The system of claim 91, wherein said information about said selected advertisement's display includes at least one of (i) a measured display time of said selected advertisement to said at least one user, (ii) a number of said at least one user that viewed said selected advertisement, (iii) anticipated display time of said selected advertisement to said at least one user, (iv) said one or more locations of each of said one or more advertisements, or (v) information on exposure of said one or more advertisements to said at least one user.

94. The system of claim 82, wherein said one or more rewards include at least one of coupons, merchandise, credits, goods, services, information about said virtual world, opportunities in said virtual world, real money, or virtual money.

95. The system of claim 82, further comprising:
   second means for creating a consumer profile for said participant, wherein said consumer profile includes at least one of (a) registration information, (b) environment continuation information to allow said participant to continue where said participant previously left in said virtual world, (c) information on one or more said selected advertisements of said participant, (d) information on said at least one selection of said one or more advertisements, or (e) information on said at least one selection of said one or more locations, or (f) reward information.

96. The system of claim 82, wherein said one or more advertisements are located on at least one of an avatar, a virtual space, or a virtual object of said participant within said virtual world.

97. The system of claim 82, wherein said virtual world is implemented by interactive media.

98. The system of claim 97, wherein said interactive media is provided by at least one of (a) one or more servers and one or more databases, or (b) interactive television.

99. The system of claim 82, wherein said one or more advertisements are displayed at least at one of (i) times designated by said participant, or (ii) times designated by at least one of a host or an advertiser.

100. The system of claim 82, wherein said one or more advertisements include at least one of (a) text, (b) symbols, (c) graphics, (d) graphics that are texture-mapped in said virtual world, or (e) multimedia elements of audio, video, and animation.

101. The system of claim 82, wherein said one or more advertisements include at least one of (a) corporate symbols, (b) logos, (c) trademarks, (d) advertising text or copy, (e) graphical pictures, or (f) multimedia elements.

102. The system of claim 83, further comprising:
   means for logging said one or more interactions of said at least one user.

103. The system of claim 102, wherein said means for logging is performed by one or more servers.

104. The system of claim 83, further comprising:
   means for reporting information based on said one or more interactions to an advertiser.

105. The system of claim 82, wherein said one or more advertisements are created by an advertiser.

106. The system of claim 82, wherein said one or more advertisements are provided by an advertiser.

107. The system of claim 82, wherein said one or more advertisements are provided by said participant and approved by an advertiser.

108. The system of claim 83, further comprising:
   means for billing an advertiser in connection with said one or more interactions.

109. A computer program product that is capable of providing instructions which when executed by a computing platform cause said computer platform to perform operations for selected advertising in a virtual world, comprising:
   providing one or more advertisements to a participant, wherein users of said virtual world include said participant;
   receiving at least one selection of said one or more advertisements from said participant;
   providing one or more locations for said participant to choose to display said one or more advertisements in said virtual world;

receiving at least one selection of said one or more locations from said participant;

creating a selected advertisement from said at least one selection of said one or more advertisements and said at least one selection of said one or more locations;

providing for display to at least one of said users said selected advertisement in said virtual world, wherein said users are participants in said virtual world or viewers of said virtual world; and providing a reward to at least said participant, wherein said reward is based on at least said providing for display to at least one of said users.

110. The computer program product of claim 109, wherein providing a reward comprises:

tracking one or more interactions with said selected advertisement by said at least one of said users; and providing a reward to at least said participant, wherein said reward is based on at least said one or more interactions.

111. The computer program product of claim 110, wherein said one or more interactions includes viewing of said selected advertisement by said at least one of said users.

112. The computer program product of claim 109, wherein said participant creates at least one of said one or more advertisements.

113. The computer program product of claim 112, wherein said participant's creation of said one or more advertisements is provided in at least one of i) said virtual world or ii) one or more ancillary support environments.

114. The computer program product of claim 109, wherein said participant's selection of said one or more advertisements is provided in at least one of i) said virtual world or ii) one or more ancillary support environments.

115. The computer program product of claim 109, wherein said participant's selection of said one or more locations is provided in at least one of i) said virtual world or ii) one or more ancillary support environments.

116. The computer program product of claim 110, wherein said one or more interactions occurs in at least one of a computer game, a video game, an online chat, an instant message, or one or more virtual scenes.

117. The computer program product of claim 116, wherein said one or more virtual scenes include at least one of a dance, party, sporting event, gambling event, meeting, shopping mall, town square, trade show, rally, conference, life simulation, or fantasy simulation.

118. The computer program product of claim 110, wherein said tracking includes gathering information about at least one of (i) providing said one or more advertisements to said participant, (ii) receiving said at least one selection of said one or more advertisements from said participant, (iii) providing said one or more locations for said participant to chose to display said one or more advertisements, (iv) receiving said at least one selection of said one or more locations, (v) providing for said display to said at least one of said user said selected advertisement, (vi) said participant, (vii) said one or more advertisements included in said selected advertisement, or (viii) said selected advertisement's display to at least one user.

119. The computer program product of claim 118, further comprising: providing information based on said tracking to at least one of a host, an advertiser, said participant, or at least one of said users.

120. The computer program product of claim 118, wherein said information about said selected advertisement's display includes at least one of (i) a measured display time of said selected advertisement to said at least one user, (ii) a number of said at least one user that viewed said selected advertisement, (iii) anticipated display time of said selected advertisement to said at least one user, (iv) said one or more locations of each of said one or more advertisements, or (v) information on exposure of said one or more advertisements to said at least one user.

121. The computer program product of claim 109, wherein said one or more rewards include at least one of coupons, merchandise, credits, goods, services, information about said virtual world, opportunities in said virtual world, real money, or virtual money.

122. The computer program product of claim 109, further comprising:

creating a consumer profile for said participant, wherein said consumer profile includes at least one of (a) registration information, (b) environment continuation information to allow said participant to continue where said participant previously left in said virtual world, (c) information on one or more said selected advertisements of said participant, (d) information on said at least one selection of said one or more advertisements, or (e) information on said at least one selection of said one or more locations, or (f) reward information.

123. The computer program product of claim 109, wherein said one or more advertisements are located on at least one of an avatar, a virtual space, or a virtual object of said participant within said virtual world.

124. The computer program product of claim 109, wherein said virtual world is implemented by interactive media.

125. The computer program product of claim 124, wherein said interactive media is provided by at least one of (a) one or more servers and one or more databases, or (b) interactive television.

126. The computer program product of claim 109, wherein said one or more advertisements are displayed at least at one of (i) times designated by said participant, or (ii) times designated by at least one of a host or an advertiser.

127. The computer program product of claim 109, wherein said one or more advertisements include at least one of (a) text, (b) symbols, (c) graphics, (d) graphics that are texture-mapped in said virtual world, or (e) multimedia elements of audio, video, and animation.

128. The computer program product of claim 109, wherein said one or more advertisements include at least one of (a) corporate symbols, (b) logos, (c) trademarks, (d) advertising text or copy, (e) graphical pictures, or (f) multimedia elements.

129. The computer program product of claim 110, further comprising:

logging said one or more interactions of said at least one user.

130. The computer program product of claim 129, wherein said logging is performed by one or more servers.

131. The computer program product of claim 110, further comprising: reporting information based on said one or more interactions to an advertiser.

132. The computer program product of claim 109, wherein said one or more advertisements are created by an advertiser.

133. The computer program product of claim 109, wherein said one or more advertisements are provided by an advertiser.

134. The computer program product of claim 109, wherein said one or more advertisements are provided by said participant and approved by an advertiser.

135. The computer program product of claim 110, further comprising:
    billing an advertiser in connection with said one or more interactions.

136. A computer program product that is capable of providing instructions which when executed by a computing platform cause said computer platform to perform operations for selected advertising in a virtual world, comprising:
    providing one or more advertisements to a participant wherein users of said virtual world include said participant;
    receiving at least one selection of said one or more advertisements from said participant;
    providing one or more locations for said participant to choose to display said one or more advertisements in said virtual world;
    receiving at least one selection of said one or more locations from said participant;
    creating a selected advertisement from said at least one selection of said one or more advertisements and said at least one selection of said one or more locations;
    providing for display to at least one of said users said selected advertisement in said virtual world, wherein said users are participants in said virtual world or viewers of said virtual world; and
    providing a reward to at least one of a host or an advertiser, wherein said reward is based on at least one of (i) providing said one or more advertisements to said participant, (ii) receiving said at least one selection of said one or more advertisements from said participant. (iii) providing said one or more locations for said participant to choose to display said one or more advertisements, (iv) receiving said at least one selection of said one or more locations, or (v) providing for said display to said at least one of said users said selected advertisement.

137. The computer program product of claim 136, wherein providing a reward comprises:
    tracking one or more interactions with said selected advertisement by said at least one of said users; and
    providing a reward to said at least one of a host or an advertiser, wherein said reward is based on at least said one or more interactions.

138. The computer program product of claim 137, wherein said one or more interactions includes viewing of said selected advertisement by said at least one of said users.

139. The computer program product of claim 136, wherein said participant creates at least one of said one or more advertisements.

140. The computer program product of claim 139, wherein said participant's creation of said one or more advertisements is provided in at least one of i) said virtual world or ii) one or more ancillary support environments.

141. The computer program product of claim 136, wherein said participant's selection of said one or more advertisements is provided in at least one of i) said virtual world or ii) one or more ancillary support environments.

142. The computer program product of claim 136, wherein said participant's selection of said one or more locations is provided in at least one of i) said virtual world or ii) one or more ancillary support environments.

143. The computer program product of claim 137, wherein said one or more interactions occurs in at least one of a computer game, a video game, an online chat, an instant message, or one or more virtual scenes.

144. The computer program product of claim 143, wherein said one or more virtual scenes include at least one of a dance, party, sporting event, gambling event, meeting, shopping mall, town square, trade show, rally, conference, life simulation, or fantasy simulation.

145. The computer program product of claim 137, wherein said tracking includes gathering information about at least one of (i) providing said one or more advertisements to said participant, (ii) receiving said at least one selection of said one or more advertisements from said participant, (iii) providing said one or more locations for said participant to chose to display said one or more advertisements, (iv) receiving said at least one selection of said one or more locations, (v) providing for said display to said at least one of said users said selected advertisement, (vi) said participant, (vii) said one or more advertisements included in said selected advertisement, or (viii) said selected advertisement's display to at least one user.

146. The computer program product of claim 145, further comprising: providing information based on said tracking to at least one of a host, an advertiser, said participant, or at least one of said users.

147. The computer program product of claim 145, wherein said information about said selected advertisement's display includes at least one of (i) a measured display time of said selected advertisement to said at least one user, (ii) a number of said at least one user that viewed said selected advertisement, (iii) anticipated display time of said selected advertisement to said at least one user, (iv) said one or more locations of each of said one or more advertisements, or (v) information on exposure of said one or more advertisements to said at least one user.

148. The computer program product of claim 136, wherein said one or more rewards include at least one of coupons, merchandise, credits, goods, services, information about said virtual world, opportunities in said virtual world, real money, or virtual money.

149. The computer program product of claim 136, further comprising:
    creating a consumer profile for said participant, wherein said consumer profile includes at least one of (a) registration information, (b) environment continuation information to allow said participant to continue where said participant previously left in said virtual world, (c) information on one or more said selected advertisements of said participant, (d) information on said at least one selection of said one or more advertisements, or (e) information on said at least one selection of said one or more locations, or (f) reward information.

150. The computer program product of claim 136, wherein said one or more advertisements are located on at least one of an avatar, a virtual space, or a virtual object of said participant within said virtual world.

151. The computer program product of claim 136, wherein said virtual world is implemented by interactive media.

152. The computer program product of claim 151, wherein said interactive media is provided by at least one of (a) one or more servers and one or more databases, or (b) interactive television.

153. The computer program product of claim 136, wherein said one or more advertisements are displayed at least at one of (i) times designated by said participant, or (ii) times designated by at least one of a host or an advertiser.

154. The computer program product of claim 136, wherein said one or more advertisements include at least one of (a) text, (b) symbols, (c) graphics, (d) graphics that are texture-mapped in said virtual world, or (e) multimedia elements of audio, video, and animation.

155. The computer program product of claim 136, wherein said one or more advertisements include at least one of (a) corporate symbols, (b) logos, (c) trademarks, (d) advertising text or copy, (e) graphical pictures, or (f) multimedia elements.

156. The computer program product of claim 137, further comprising:

logging said one or more interactions of said at least one user.

157. The computer program product of claim 156, wherein said logging is performed by one or more servers.

158. The computer program product of claim 137, further comprising: reporting information based on said one or more interactions to an advertiser.

159. The computer program product of claim 136, wherein said one or more advertisements are created by an advertiser.

160. The computer program product of claim 136, wherein said one or more advertisements are provided by an advertiser.

161. The computer program product of claim 136, wherein said one or more advertisements are provided by said participant and approved by an advertiser.

162. A computer program product of claim 137, further comprising:

billing an advertiser in connection with said one or more interactions.

\* \* \* \* \*